H. W. KIRCHNER.
SPRING WHEEL.
APPLICATION FILED FEB. 19, 1920.
1,411,665.
Patented Apr. 4, 1922.
2 SHEETS—SHEET 2.
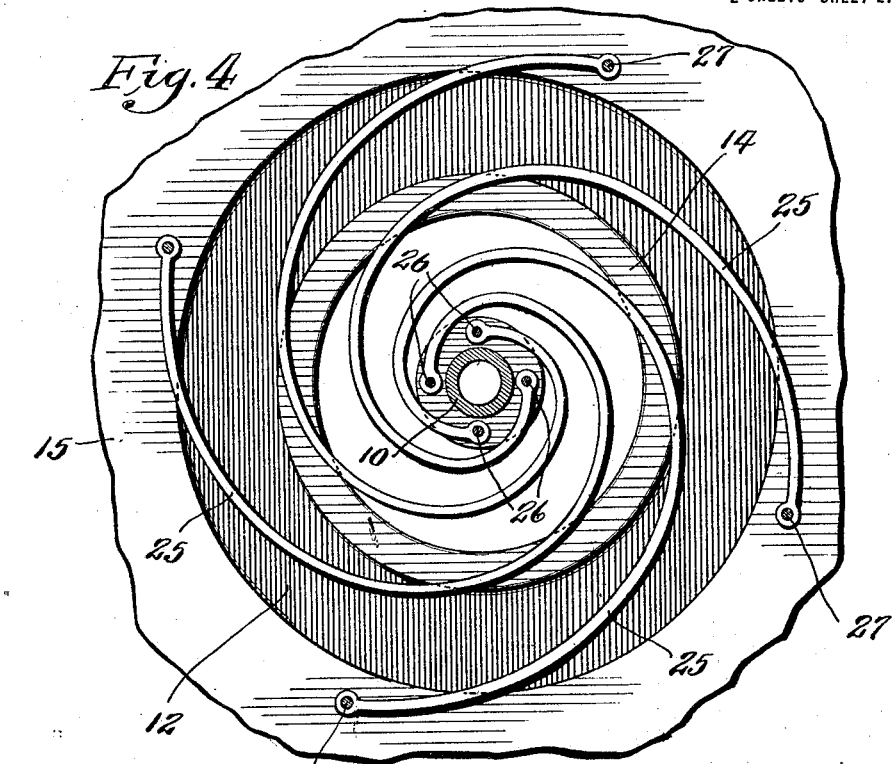
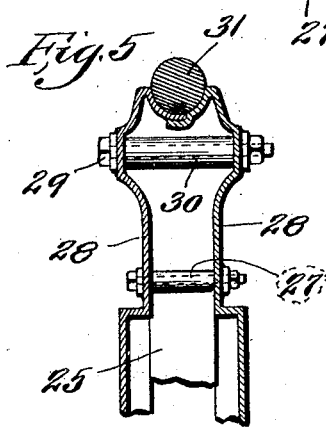
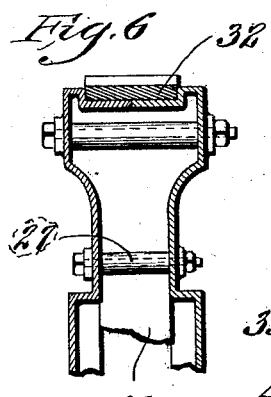
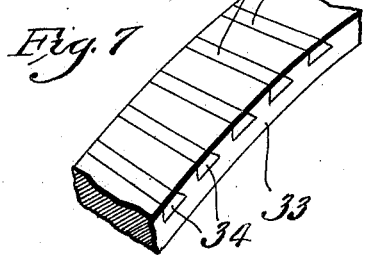
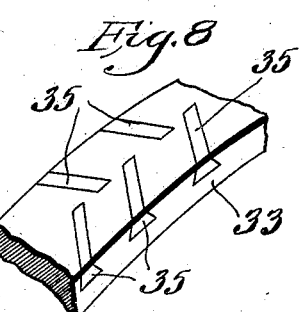
Inventor
Henry W. Kirchner

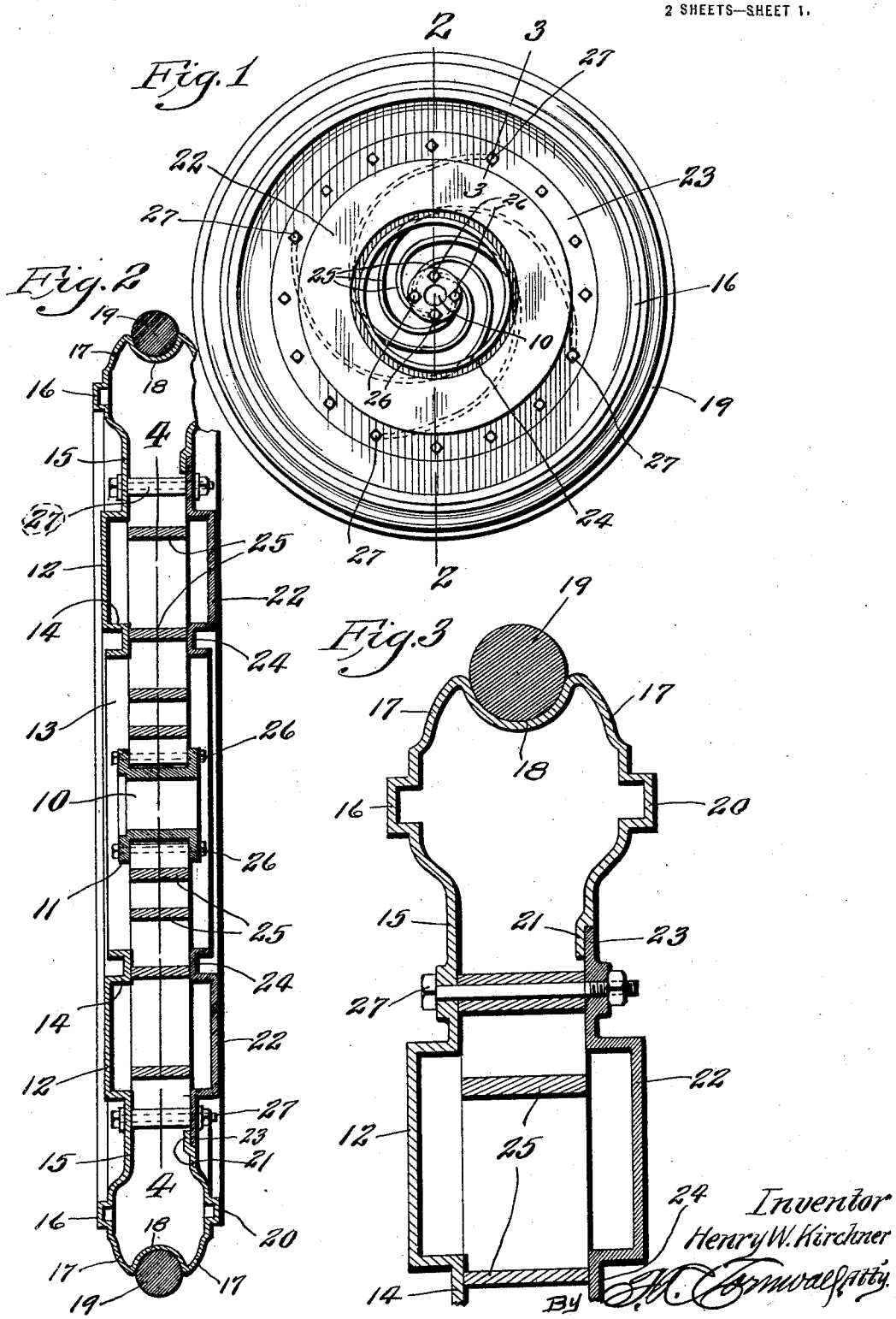

UNITED STATES PATENT OFFICE.

HENRY W. KIRCHNER, OF ST. LOUIS, MISSOURI.

SPRING WHEEL.

1,411,665.  Specification of Letters Patent.  Patented Apr. 4, 1922.

Application filed February 19, 1920. Serial No. 359,778.

*To all whom it may concern:*

Be it known that I, HENRY W. KIRCHNER, a citizen of the United States, residing at St. Louis, Missouri, have invented a certain new and useful Improvement in Spring Wheels, of which the following is a full, clear, and exact description, such as will enable others skilled in the art to which it appertains to make and use the same, reference being had to the accompanying drawings, forming part of this specification.

My invention relates generally to vehicle wheels and more particularly to that type of wheel known as a spring or resilient wheel, and in which the rim and tire portion of the wheel is yieldingly supported from the wheel hub.

The principal objects of my invention are, to generally improve upon and simplify the construction of the existing types of spring wheels, and to provide a relatively simple and highly resilient shock absorbing wheel that has great strength and durability and which is particularly designed for use on motor-driven vehicles.

Further objects of my invention are, to provide a resilient wheel having a plurality of curved spring spokes disposed between the rim and the hub, and arranged so as to permit the hub to yieldingly shift its position a considerable extent with respect to the axis of the wheel; to provide a construction wherein both edges of the resilient spokes have considerable bearing on rigid parts of the wheel body, thereby maintaining said spokes in proper operative position and preventing dishing of the wheel; further to provide a resilient wheel which combines maximum strength and minimum weight with compactness, efficiency and durability, and said wheel having all the advantages and durable features of a pneumatic tire wheel without the disadvantages of punctures, blow-outs, and rapid deterioration.

A further object of my invention is to provide a resilient wheel having a metal tire in the face of which is embedded inserts of comparatively soft metal which tend to resist wear, and at the same time prevent the wheel from slipping or skidding upon smooth or soft surfaces.

With the foregoing and other objects in view, my invention consists in certain novel features of construction and arrangement of parts, hereinafter more fully described and claimed, and illustrated in the accompanying drawings, in which—

Figure 1 is an elevational view of a resilient wheel of my improved construction.

Figure 2 is an enlarged vertical section taken approximately on the line 2—2 of Figure 1.

Figure 3 is an enlarged section taken approximately on the line 3—3 of Figure 1 and showing the means utilized for connecting the outer ends of the resilient spokes to the rim portion of the wheel.

Figure 4 is a section taken approximately on the line 4—4 of Figure 2.

Figure 5 is a section taken through the rim portion of a modified form of the resilient wheel.

Figure 6 is a section taken through the rim portion of a further modified form of the wheel.

Figures 7 and 8 are perspective views of portions of different forms of tires that are adapted to be used on my improved wheel and which tires are provided with relatively soft metal inserts.

In the embodiment of my invention, as illustrated in Figures 1 to 4 inclusive, which show a preferred construction, 10 designates the hub portion of the wheel, the same being in the form of a short tubular member, and provided on its ends with outwardly projecting flanges 11, the latter serving as points of attachment for the inner ends of the resilient spokes.

The outer or rim portion of the wheel includes a circular side plate 12 provided with a centrally arranged opening 13 and the wall of said plate immediately adjacent to said opening being bent inwardly to form an annular rib or flange 14, the inner flat face of which serves as a bearing against which the corresponding edges of the resilient spokes are adapted to engage. Plate 12 is preferably formed of sheet metal, although, if desired, it may be cast and a portion of said plate outside the rib or flange 14 is inset with respect to the main body portion of the plate to form an inwardly projecting rib or flange 15, the same being concentric with the rib or flange 14, and the inner face of said inset portion 15 serves as a bearing for the outer portions of the resilient spokes. A portion of the plate immediately outside of this inset portion 15 is pressed or extended outward to form a concentric annular rib or flange 16 which is effective in materially reinforcing the rim portion of the wheel. Beyond the reinforcing flange 16, the plate is bent or shaped to form a rim such as 17, in the periphery of which is formed a channel 18 that is adapted to receive a tire 19. This tire may be formed from any suitable material such as rubber composition, wood or metal, and while the body of said tire may be rounded as shown, it may be of any desired cross sectional shape.

That portion of the rim 17 directly opposite the reinforcing rib 16 is provided with an outwardly projecting reinforcing rib 20 and from this last mentioned rib the rim portion extends inwardly a short distance, and formed in the outer face of its inner edge is an annular recess such as 21. A ring plate 22, either cast or of pressed sheet metal, constitutes the side wall of the outer or rim portion of the wheel opposite to the plate 12, the outer portion of said ring plate 22 being inset as designated by 23 and the edge of said inset portion being positioned in the annular recess 21. The inner portion of the ring plate 22 is inset to form an annular reinforcing rib or flange 24, the same being positioned directly opposite to rib or flange 14, and the inner face of said rib or flange 24 serves as a bearing for the adjacent edges of the resilient spokes of the wheel. These resilient spokes designated by the numeral 25 are preferably formed from flat pieces of resilient metal such as steel, the same being spirally bent and their inner ends being positioned between and connected in any suitable manner to the flanges 11 of the hub 10.

A simple means of fastening the inner ends of these resilient spokes is to form loops on said inner ends or to perforate the same laterally and extend through said loops or perforations, pins or bolts 26 and which latter are removably seated in the flanges 11. By virtue of the spiral formation of these resilient spokes, portions thereof intermediate their ends lie between the inwardly projecting ribs or flanges 14 and 24, and the edges of these portions normally bear directly against said ribs or flanges, such construction putting the intermediate portions of the spokes in shear so as to effectually resist lateral strains which would otherwise tend to dish the wheel to such an extent as to render it inoperative.

The outer ends of the resilient spokes are secured in any suitable manner to pins or bolts 27, the latter being seated in the inset outer portion 15 of plate 12 and in the inset outer portion of plate 22. Thus the eye of the spoke and the bolt 27 form a connecting spacing and stay-bolt between the plates. The bolts utilized for securing the outer ends of the resilient spokes also serve to retain the removable plate 22 in proper position upon the wheel. (See Fig. 3).

It will be understood that the spindle of an axle is positioned in hub 10 and when so positioned the axle and body of the wheel will readily yield relative to each other as the wheel passes over the surface of the ground, and by virtue of the resilient properties of the springs 25, they will absorb all vibration and jars which would otherwise be transmitted to the vehicle body supported by the axle.

One of the principal disadvantages of resilient wheels heretofore developed has been the tendency of the wheels to dish or collapse laterally due to imposed side strains during the passage of the wheel around corners or sharp curves, but in my improved wheel, intermediate portions of the resilient spokes are for a considerable distance in direct engagement with the inwardly projecting ribs or flanges 14 and 24, and this rubbing support or bearing effectually counteracts any tendency of the resilient spokes to shift laterally in either direction, and which action, it will be understood, would result in a dishing or lateral collapse of the wheel. Further, the edges of the outer portions of the resilient spokes bear for a considerable distance against the inner faces of the adjacent walls of the rim portion of the wheel, and such engagement not only spaces the side plates, but also materially reinforces and strengthens the entire structure.

In Figure 5 I have illustrated a modified construction wherein the outer portion of the wheel is formed by a pair of plates 28, the same being substantially alike in construction, and somewhat similar to plate 12, heretofore described. These plates are secured to each other by transverse bolts or pins such as 29 upon which, between the plates, are arranged tubular spacing members such as 30. The outer portions of these plates 28 are bent inwardly to form an annular peripheral channel which is adapted to receive a suitable tire, such as 31.

The modified construction illustrated in Figure 6 involves the construction of a shallow channel in the periphery of the wheel structure, and which shallow channel receives a flat tire 32 of metal, rubber, or composition.

The form of tire illustrated in Figure 6 includes a relatively narrow band 33 of metal, such as iron or steel, and positioned in the outer face thereof is a series of transversely disposed inserts 34 of relatively soft metal which are adapted to develop friction when in contact with a surface, and thus acting to reduce the tendency of the wheel to skid upon slippery surfaces or to spin in mud or sand.

In the construction illustrated in Figure 8, the relatively soft metal inserts 35 occupy inclined positions in the tread surface of the tire.

A resilient wheel of my improved construction is comparatively simple, is capable of being easily and cheaply produced, can be readily assembled or taken apart, is light, strong and durable, and is very effective in performing its intended functions.

It will be readily understood that minor changes in the size, form and construction of the various parts of my improved wheel can be made and substituted for those herein shown and described, without departing from the spirit of my invention, the scope of which is set forth in the appended claims.

I claim:

1. A wheel comprising a web portion consisting of a pair of plates spaced apart and provided with inwardly projecting annular ribs, said plates being provided with centrally arranged openings, a hub, and a plurality of resilient spokes, the inner ends of which are connected to said hub, the outer ends of said spokes being connected to said plates, and the edges of which spokes are normally in contact with the inner surfaces of the annular ribs on said plates.

2. In a resilient wheel, a pair of spaced parallel plates, the outer portions of which are connected to form a rim, openings formed in the centers of said plates, radially spaced concentric bearing ribs projecting inwardly from each of said plates, resilient spokes positioned between said plates, the edges of which spokes bear against the faces of said annular ribs, the outer ends of said spokes being formed with eyes and bolted therethrough to the outer one of said ribs, and a hub carried by the inner ends of said spokes adjacent to said openings.

3. In a spring wheel, a pair of connected parallel circular plates having annular inset portions radially spaced from each other, a hub, resilient spokes extending between the plates each pivotally connected at opposite ends to said hub and to the outer inset portion of said plates, respectively, whereby the radially innermost inset portion of said plates engages said spokes at points intermediate the points of attachment of the spokes.

4. In a spring wheel, a pair of parallel circular plates each having inset annular portions radially spaced from each other, a hub, spiral resilient spokes having eyes at their outer ends, means pivotally connecting the inner ends of said spokes to said hub, and bolts passing through the outer eyes of said spokes to pivotally connect said spokes to said plates at the radially outermost inset portions of said plates, said spokes having limited portions of their edges bearing against the radially innermost inset portions of said plates.

5. In a spring wheel, a pair of separable parallel plates having integral annular inset portions adjacent to their periphery, bolts for connecting the inset portions of the two plates together, resilient spokes having eyes in their outer ends embracing said bolts and spacing said plates, a hub, and connections between said hub and the inner ends of said spokes, said hub being free to move diametrically of said plates.

6. In a spring wheel, a hollow web comprising a pair of spaced plates, the outer portions of which are connected, the inner portions of said plates being provided with openings, inwardly projecting annular ribs on said plates adjacent to said openings, resilient spokes disposed within said hollow web, the edges of which spokes are in direct contact with the inner faces of said ribs, and a hub carried by the inner ends of said spokes.

7. In a spring wheel, a web composed of a pair of spaced plates, the outer portions of which are connected, there being openings formed in the centers of said plates, spaced inset portions in the sides thereof adjacent to said openings and to the wheel periphery, spirally disposed resilient spokes positioned between and having restricted portions of their edges bearing against opposite inset portions of said web, and a hub carried by the inner ends of said spokes in line with the central openings in said plates.

In testimony whereof I hereunto affix my signature this 14th day of February, 1920.

HENRY W. KIRCHNER.